(12) United States Patent
Zielinski et al.

(10) Patent No.: US 8,098,240 B2
(45) Date of Patent: Jan. 17, 2012

(54) CAPACITIVE TOUCHPAD AND TOY INCORPORATING THE SAME

(75) Inventors: James Zielinski, Hawthorne, CA (US); Charles H. De Voe, Portland, OR (US)

(73) Assignee: Mattel, Inc., El Segundo, CA (US)

( * ) Notice: Subject to any disclaimer, the term of this patent is extended or adjusted under 35 U.S.C. 154(b) by 473 days.

(21) Appl. No.: 12/464,614

(22) Filed: May 12, 2009

(65) Prior Publication Data

US 2009/0318229 A1 Dec. 24, 2009

Related U.S. Application Data

(60) Provisional application No. 61/074,554, filed on Jun. 20, 2008, provisional application No. 61/083,395, filed on Jul. 24, 2008.

(51) Int. Cl.
*G06F 3/045* (2006.01)
(52) U.S. Cl. ...................... 345/174; 178/18.06
(58) Field of Classification Search .......... 345/173–179; 178/18.01–18.06, 19.01–19.06, 20.01–20.04
See application file for complete search history.

(56) References Cited

U.S. PATENT DOCUMENTS

| | | |
|---|---|---|
| 3,232,404 A | 2/1966 | Jones, Jr. |
| 3,519,802 A | 7/1970 | Cinque et al. |
| 3,585,368 A | 6/1971 | Nunamaker |
| 3,632,993 A | 1/1972 | Acker |
| 3,777,165 A | 12/1973 | Bryant et al. |
| 3,790,756 A | 2/1974 | Graves et al. |
| 3,918,028 A | 11/1975 | Humphrey et al. |
| 4,039,940 A | 8/1977 | Butler et al. |
| 4,055,747 A | 10/1977 | Jensen |
| 4,074,114 A | 2/1978 | Dobras |
| 4,090,092 A | 5/1978 | Serrano |
| 4,103,252 A | 7/1978 | Bobick |
| 4,272,916 A | 6/1981 | Giordano et al. |
| 4,334,280 A | 6/1982 | McDonald |
| 4,345,167 A | 8/1982 | Calvin |

(Continued)

FOREIGN PATENT DOCUMENTS

AU 2007254709 A1 1/2008

(Continued)

OTHER PUBLICATIONS

The International Bureau of WIPO, International Preliminary Report on Patentability, Jan. 6, 2011, 6 pages.

(Continued)

*Primary Examiner* — Vijay Shankar
(74) *Attorney, Agent, or Firm* — Kolisch Hartwell, PC

(57) ABSTRACT

Capacitive touchpad assemblies, toys including capacitive touchpad assemblies and integral card readers, and methods for detecting contact with a capacitive touch surface are provided. A capacitive touch surface may have a capacity that varies depending on whether it is being contacted by an object such as a human finger. A voltage of the capacitive touch surface may be altered during each of a predetermined number of recurring time intervals. The capacitance of the capacitive touch surface will determine the amount of time required to alter its voltage to a threshold voltage within each time interval. The sum amount of time required for the voltage of the capacitive touch surface to reach the threshold voltage in a predetermined number of time intervals may be used to determine whether the capacitive touch surface is being touched.

19 Claims, 7 Drawing Sheets

U.S. PATENT DOCUMENTS

| | | | |
|---|---|---|---|
| 4,355,300 | A | 10/1982 | Weber |
| 4,359,222 | A | 11/1982 | Smith, III et al. |
| 4,488,679 | A | 12/1984 | Bockholt et al. |
| 4,550,221 | A | 10/1985 | Mabusth |
| 4,595,913 | A | 6/1986 | Aubuchon |
| 4,599,511 | A | 7/1986 | Stiller |
| 4,639,874 | A | 1/1987 | Pezaris |
| 4,687,200 | A | 8/1987 | Shirai |
| 4,700,309 | A | 10/1987 | Naito et al. |
| 4,729,564 | A | 3/1988 | Kuna et al. |
| 4,743,773 | A | 5/1988 | Katana et al. |
| 4,807,296 | A | 2/1989 | Ando et al. |
| 4,818,847 | A | 4/1989 | Hara et al. |
| 4,884,974 | A | 12/1989 | DeSmet |
| 4,890,832 | A | 1/1990 | Komaki |
| 4,916,740 | A | 4/1990 | Noda et al. |
| 4,947,335 | A | 8/1990 | Blitchington |
| 4,952,051 | A | 8/1990 | Lovell et al. |
| 4,969,647 | A | 11/1990 | Mical et al. |
| 4,999,462 | A | 3/1991 | Purcell |
| 5,088,928 | A | 2/1992 | Chan |
| 5,159,181 | A | 10/1992 | Bartels et al. |
| 5,334,022 | A | 8/1994 | Kitagawa et al. |
| 5,352,879 | A | 10/1994 | Milch |
| 5,353,016 | A | 10/1994 | Kurita et al. |
| 5,369,261 | A | 11/1994 | Shamir |
| 5,374,787 | A | 12/1994 | Miller et al. |
| 5,386,219 | A | 1/1995 | Greanias et al. |
| 5,413,518 | A | 5/1995 | Lin |
| 5,471,040 | A | 11/1995 | May |
| 5,511,980 | A | 4/1996 | Wood |
| 5,562,452 | A | 10/1996 | Atugi et al. |
| 5,576,981 | A | 11/1996 | Parker et al. |
| 5,586,042 | A | 12/1996 | Pisau et al. |
| 5,599,046 | A | 2/1997 | Behm et al. |
| 5,601,489 | A | 2/1997 | Komaki |
| 5,682,032 | A | 10/1997 | Philipp |
| 5,709,219 | A | 1/1998 | Chen et al. |
| 5,730,165 | A | 3/1998 | Philipp |
| 5,760,383 | A | 6/1998 | Heske, III |
| 5,760,715 | A | 6/1998 | Senk et al. |
| 5,769,643 | A | 6/1998 | Stevens, III |
| 5,777,596 | A | 7/1998 | Herbert |
| 5,813,861 | A | 9/1998 | Wood |
| 5,831,597 | A | 11/1998 | West et al. |
| 5,844,506 | A | 12/1998 | Binstead |
| 5,851,119 | A | 12/1998 | Sharpe, III et al. |
| 5,853,327 | A | 12/1998 | Gilboa |
| 5,914,477 | A | 6/1999 | Wang |
| 5,920,309 | A | 7/1999 | Bisset et al. |
| 5,933,102 | A | 8/1999 | Miller et al. |
| 5,949,060 | A | 9/1999 | Schattschneider et al. |
| 5,977,867 | A | 11/1999 | Blouin |
| 6,020,849 | A | 2/2000 | Fukuzaki et al. |
| 6,097,189 | A | 8/2000 | Arndt et al. |
| 6,102,397 | A | 8/2000 | Lee et al. |
| 6,105,869 | A | 8/2000 | Scharf et al. |
| 6,157,454 | A | 12/2000 | Wagner et al. |
| 6,168,494 | B1 | 1/2001 | Engel et al. |
| 6,200,216 | B1 | 3/2001 | Peppel |
| 6,202,929 | B1 | 3/2001 | Verschuur et al. |
| 6,227,931 | B1 | 5/2001 | Shackelford |
| 6,260,763 | B1 | 7/2001 | Svetal |
| 6,297,812 | B1 | 10/2001 | Ohara et al. |
| 6,327,459 | B2 | 12/2001 | Redford et al. |
| 6,347,813 | B1 | 2/2002 | Star et al. |
| 6,362,737 | B1 | 3/2002 | Rodgers et al. |
| 6,429,846 | B2 | 8/2002 | Rosenberg et al. |
| 6,443,796 | B1 | 9/2002 | Shackelford |
| 6,466,036 | B1 | 10/2002 | Philipp |
| 6,471,565 | B2 | 10/2002 | Simeray |
| 6,572,378 | B1 | 6/2003 | Rehkemper et al. |
| 6,580,600 | B2 | 6/2003 | Toyoda et al. |
| 6,593,755 | B1 | 7/2003 | Rosengren |
| 6,615,155 | B2 | 9/2003 | Gilboa |
| 6,650,867 | B2 | 11/2003 | Redford et al. |
| 6,650,870 | B2 | 11/2003 | White et al. |
| 6,661,239 | B1 | 12/2003 | Ozick |
| 6,676,411 | B2 | 1/2004 | Rehkemper et al. |
| 6,686,908 | B1 | 2/2004 | Kobayashi |
| 6,739,874 | B2 | 5/2004 | Marcus et al. |
| 6,761,315 | B2 | 7/2004 | Kato et al. |
| 6,761,637 | B2 | 7/2004 | Weston et al. |
| 6,772,948 | B2 | 8/2004 | Kim |
| 6,781,577 | B2 | 8/2004 | Shigetaka |
| 6,802,452 | B2 | 10/2004 | Lebaschi et al. |
| 6,803,798 | B1 | 10/2004 | Wei et al. |
| 6,825,833 | B2 | 11/2004 | Mulligan et al. |
| 6,834,251 | B1 | 12/2004 | Fletcher |
| 6,835,131 | B1 | 12/2004 | White et al. |
| 6,937,152 | B2 | 8/2005 | Small |
| 6,940,291 | B1 | 9/2005 | Ozick |
| 6,968,151 | B2 | 11/2005 | Redford et al. |
| 7,006,786 | B2 | 2/2006 | Marcus et al. |
| 7,023,221 | B1 | 4/2006 | Lin |
| 7,081,033 | B1 | 7/2006 | Mawle et al. |
| 7,120,385 | B2 | 10/2006 | Marggraff |
| 7,139,523 | B1 | 11/2006 | Lynch et al. |
| 7,145,552 | B2 | 12/2006 | Hollingsworth |
| 7,148,704 | B2 | 12/2006 | Philipp |
| 7,155,976 | B2 | 1/2007 | Kai-Cheng et al. |
| 7,167,675 | B2 | 1/2007 | Lynch et al. |
| 7,190,356 | B2 | 3/2007 | Lin et al. |
| 7,203,455 | B2 | 4/2007 | Ernst et al. |
| 7,205,776 | B2 | 4/2007 | Kinoshita et al. |
| 7,219,843 | B2 | 5/2007 | Havens et al. |
| 7,224,934 | B2 | 5/2007 | Mullen |
| 7,254,775 | B2 | 8/2007 | Geaghan et al. |
| 7,265,746 | B2 | 9/2007 | Knowles et al. |
| 7,270,266 | B2 | 9/2007 | Silverbrook et al. |
| 7,286,118 | B2 | 10/2007 | Van Berkel |
| 7,328,845 | B2 | 2/2008 | Tsai |
| 7,334,735 | B1 | 2/2008 | Antebi et al. |
| 7,387,560 | B2 | 6/2008 | Brumagin et al. |
| 2002/0121552 | A1 | 9/2002 | Kim |
| 2002/0130848 | A1 | 9/2002 | Sims |
| 2003/0016210 | A1 | 1/2003 | Soto et al. |
| 2003/0067451 | A1 | 4/2003 | Tagg et al. |
| 2003/0162162 | A1 | 8/2003 | Marggraff |
| 2004/0002378 | A1 | 1/2004 | Acres et al. |
| 2004/0002387 | A1 | 1/2004 | Grady |
| 2004/0023705 | A1 | 2/2004 | Vernall |
| 2004/0031851 | A1 | 2/2004 | Bianculli et al. |
| 2004/0104890 | A1 | 6/2004 | Caldwell et al. |
| 2004/0169082 | A1 | 9/2004 | Lebaschi et al. |
| 2004/0219501 | A1 | 11/2004 | Small et al. |
| 2004/0246239 | A1 | 12/2004 | Knowles et al. |
| 2005/0043076 | A1 | 2/2005 | Lin |
| 2005/0048457 | A1 | 3/2005 | Ferrigno et al. |
| 2005/0088416 | A1 | 4/2005 | Hollingsworth |
| 2005/0208458 | A1 | 9/2005 | Smith et al. |
| 2005/0266386 | A1 | 12/2005 | Marggraff et al. |
| 2006/0017702 | A1 | 1/2006 | Shen |
| 2006/0065903 | A1 | 3/2006 | Sakurai et al. |
| 2006/0068860 | A1 | 3/2006 | Ueshima et al. |
| 2007/0091077 | A1 | 4/2007 | Lii et al. |
| 2007/0132733 | A1 | 6/2007 | Ram |
| 2007/0184900 | A1 | 8/2007 | Matsumoto et al. |
| 2007/0291009 | A1 | 12/2007 | Wright et al. |
| 2008/0023553 | A1 | 1/2008 | Jones |
| 2008/0042989 | A1 | 2/2008 | Westerman et al. |
| 2008/0042994 | A1 | 2/2008 | Gillespie et al. |
| 2008/0048997 | A1 | 2/2008 | Gillespie et al. |
| 2008/0129702 | A1 | 6/2008 | Mathiassen et al. |
| 2008/0143689 | A1 | 6/2008 | Foo et al. |
| 2008/0158178 | A1 | 7/2008 | Hotelling et al. |
| 2008/0158198 | A1 | 7/2008 | Elias |
| 2008/0162996 | A1 | 7/2008 | Krah et al. |
| 2010/0175932 | A1* | 7/2010 | Wu .................... 178/18.06 |
| 2011/0175847 | A1* | 7/2011 | Wang et al. ............. 345/174 |

FOREIGN PATENT DOCUMENTS

| | | |
|---|---|---|
| CA | 2567751 A1 | 12/2005 |
| DE | 202006013070 | 11/2006 |
| EP | 1603075 | 12/2005 |
| GB | 2275207 | 8/1994 |
| GB | 2351029 | 12/2000 |

| | | |
|---|---|---|
| GB | 2400969 | 10/2004 |
| JP | 03203766 | 9/1991 |
| JP | 11244537 | 9/1999 |
| JP | 2003047771 | 2/2003 |
| JP | 2007095098 A | 4/2007 |
| JP | 2007122326 A | 5/2007 |
| JP | 2007179520 A | 7/2007 |
| WO | 8300255 A1 | 1/1983 |
| WO | 8400075 A1 | 1/1984 |
| WO | 9718546 | 5/1997 |
| WO | 02058807 A1 | 8/2002 |
| WO | 02073587 A1 | 9/2002 |
| WO | 03043709 A1 | 5/2003 |
| WO | 03067553 A1 | 8/2003 |
| WO | 2005088580 A1 | 9/2005 |
| WO | 2005119628 A1 | 12/2005 |
| WO | 2006036851 A2 | 4/2006 |
| WO | 2006038905 A1 | 4/2006 |
| WO | 2006072806 A1 | 7/2006 |
| WO | 2006138596 A1 | 12/2006 |
| WO | 2007017702 A1 | 2/2007 |
| WO | 2007110485 A1 | 10/2007 |
| WO | 2008060641 A2 | 5/2008 |

OTHER PUBLICATIONS

TI Texas Instruments Touch & Tell, Prod. No. 1040938-0211-B, Texas Instruments Inc (1981).
Dictionary of Electronics Capacitive Coupling (1): pp. 98 (1988).
Dictionary of Electronics Capacitive Coupling (2): pp. 100-101 (1988).
Dictionary of Electronics Capacitive Coupling (3): pp. 146-147 (1988).
Dictionary of Electronics Capacitive Coupling (4): pp. 148-149 (1988).
Dictionary of Electronics Capacitive Coupling: pp. 99 (1988).
Joerg Woerner, Datamath Calculator Museum, Texas Instruments Touch and Discover foil contact keyboard, Dec. 20, 2002.
IEEE Standard Dictionary Electronics (1): pp. 928-929 (1993).
19930000 IEEE Standard Dictionary Electronics (2): pp. 838-839 (1993).
Quantum Research Group Ltd. "Qprox: Charge-Transfer Touch Sensor" (1999).
Mattel Catalog Dora the Explorer electronic bingo card reader B0829_1 (Feb. 2003).
Mattel Catalog Dora the Explorer electronic bingo card reader B0829_2. (Feb. 2003).
Mattel Electronic Talking Bingo Koala Brothers card reader with mechanical switches (Feb. 2005).
Robert Grzesek 628Design Darin Barri business card (2005).
Holylite HL5239B Membrane Switch Detector (Nov. 6, 2007).
Sonix USB Audio Contoller Data Sheet, Serial No. 11122APF (Jun. 12, 2008).
CityNews.ca Staff, "Apple Works on Solar Powered iPod While Microsoft Plans Touch Screen PC", (May 28, 2008).
Carl Pickering, "Gesture recognition technology in automobiles", Jaguar and Land Rover Technical Research, Coventry, UK (Jun. 26, 2008).
Gill, John, AVX Ltd., "Basic Tantalum Capacitor Technology" (Sep. 5, 2008).

* cited by examiner

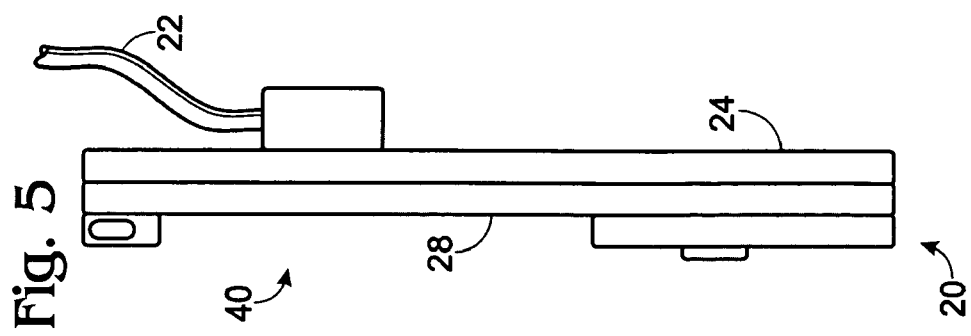
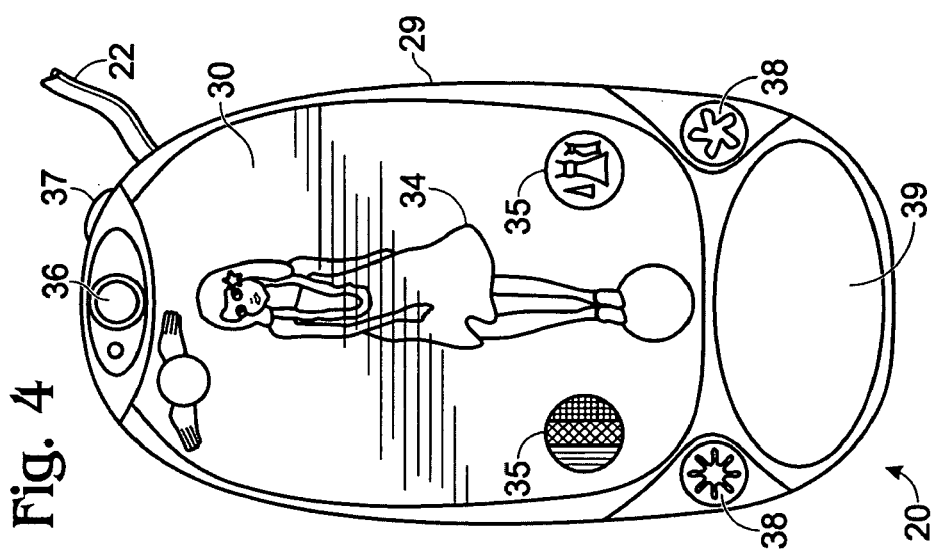
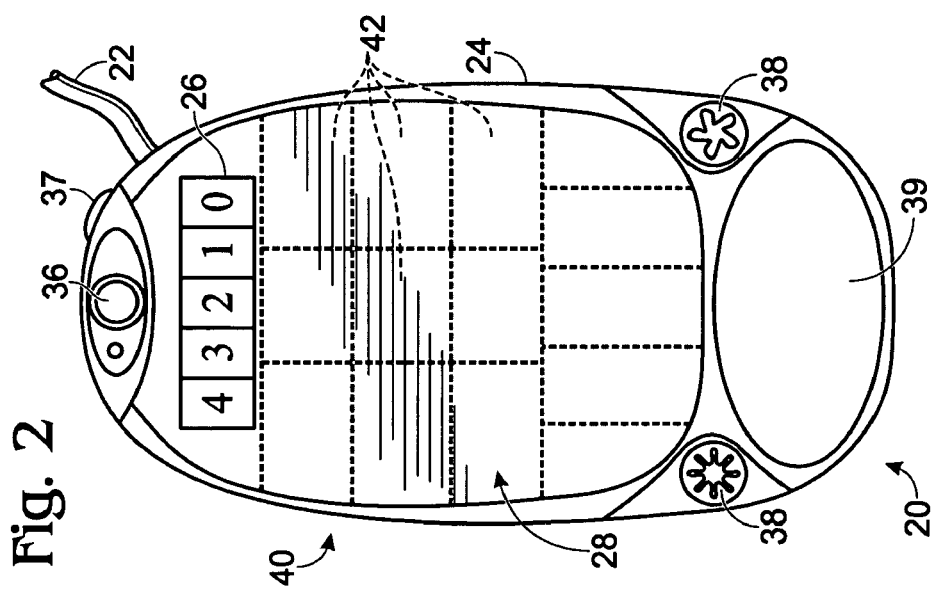

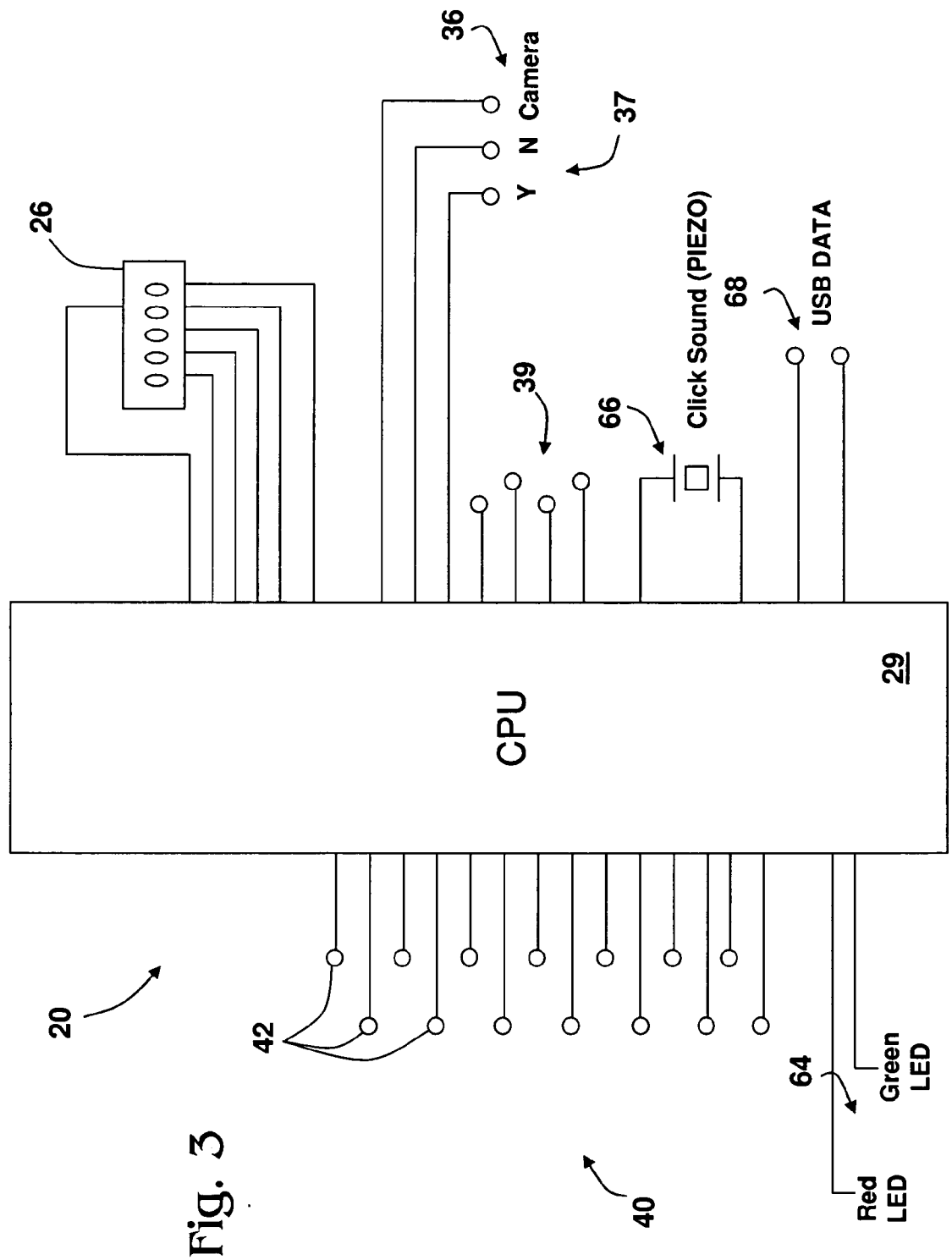

CAPACITIVE TOUCHPAD AND TOY INCORPORATING THE SAME

CROSS REFERENCE TO RELATED APPLICATIONS

This application claims priority under 35 U.S.C. §119(e) to U.S. Provisional Patent Application No. 61/074,554, filed on Jun. 20, 2008, and 61/083,395, filed on Jul. 24, 2008, both entitled "TOY WITH CAPACITIVE TOUCHPAD AND INTEGRAL CARD READER", the disclosures of which are incorporated herein by reference.

FIELD OF THE DISCLOSURE

The present disclosure relates to capacitive touchpad assemblies, as well as computer peripheral devices resembling toys and having components such as input capacitive touchpad assemblies and integral card readers. The touchpads may use capacitive sensors, and haptic feedback may be provided with a piezoelectric device. In some embodiments, limited gesture recognition may be used to improve play value.

Examples of capacitive sensors are disclosed in U.S. Pat. Nos. 4,039,940, 4,272,916, 4,355,300, 4,595,913, 5,413,518, 5,650,597, 6,661,239, 6,834,251, 6,940,291 and Publication No. US20040219501. Examples of piezoelectric devices are disclosed in U.S. Pat. Nos. 4,334,280, 6,429,846 and 6,466,036. Examples of gesture recognition are disclosed in United States Patent Publication Nos. US20060205502, US20060089197, and US20060252494. Examples of card readers are disclosed in U.S. Pat. Nos. 4,884,974, 5,334,022, 7,224,934, 7,387,560. The disclosures of all the above-referenced patents and publications are incorporated herein by reference.

SUMMARY

Capacitive touchpad assemblies, toys including capacitive touchpad assemblies and, in some cases, integral card readers, and methods for detecting contact with a capacitive touch surface are provided. A capacitive touch surface's capacitance may vary depending on whether an object such as a human finger is in contact with the surface. A voltage of the capacitive touch surface may be altered during each of a predetermined number of recurring intervals. The capacitance of the capacitive touch surface will determine the amount of time required to alter its voltage to a threshold voltage within each interval. The sum amount of time required for the voltage of the capacitive touch surface to reach the threshold voltage in a predetermined number of intervals may be used to determine whether the capacitive touch surface is being touched during that predetermined number of intervals.

BRIEF DESCRIPTION OF THE DRAWINGS

FIG. 2 is a front view of a toy including a capacitive touchpad assembly with a plurality of capacitive touch surfaces, according to one embodiment of the disclosure.

FIG. 3 depicts an example logic circuit for implementing one or more of the embodiments disclosed herein.

FIG. 4 is a front view of a toy similar to that shown in FIG. 2 with a playing card overlaying the plurality of capacitive touch surfaces, according to one embodiment of the disclosure.

FIG. 5 is a side view of a toy similar to those shown in FIGS. 1-4, according to one embodiment of the disclosure.

DETAILED DESCRIPTION

Figure 1:
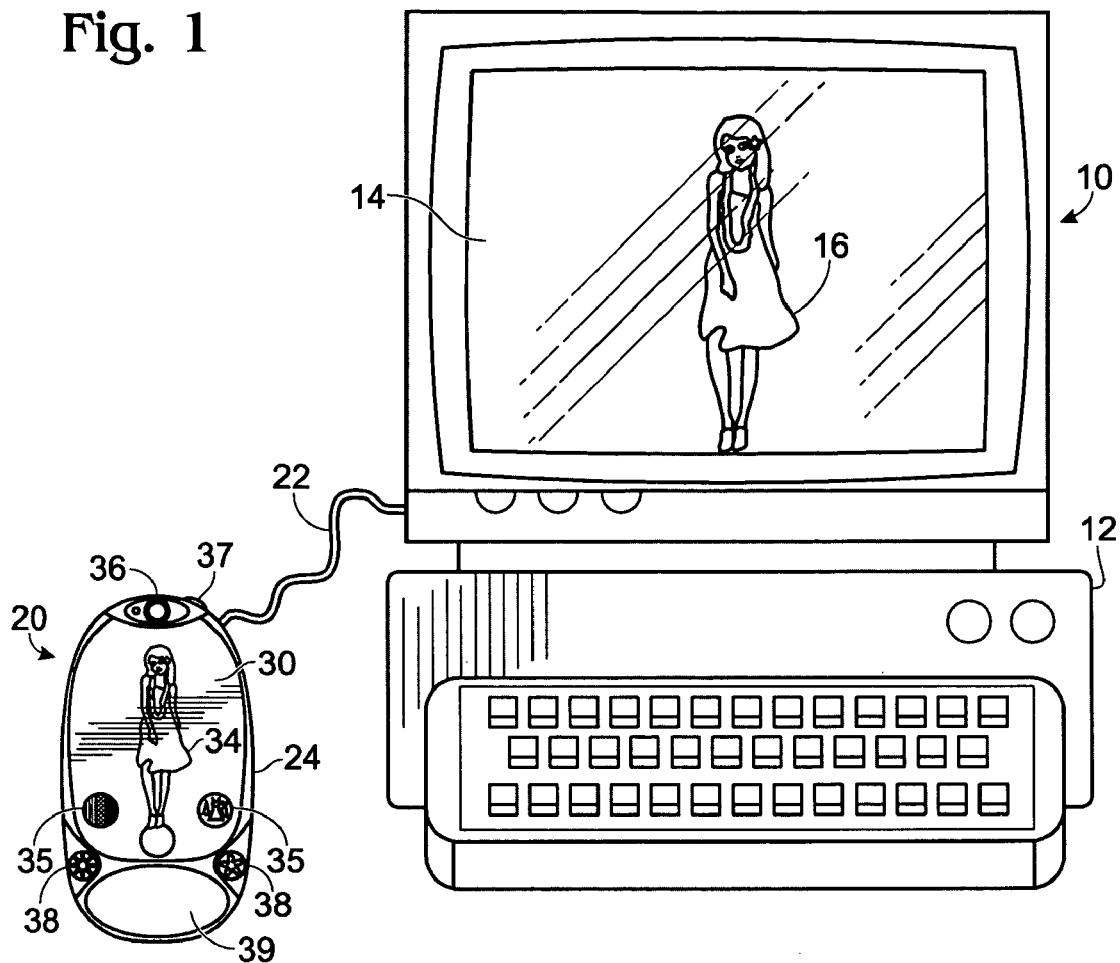
FIG. 1 depicts a toy according to the present disclosure attached to a computer, according to one embodiment of the disclosure.

Referring to the attached drawings, wherein like numerals indicate like elements, there is shown in FIG. 1 a computing device 10 including a keyboard 12 and a monitor 14 displaying an image 16. Computing device 10 also may include any number of other components that are not shown, such as a mouse, a printer, and the like. A peripheral toy 20 may be operably coupled to computing device 10 via an interface 22. Interface 22 may be a wired (e.g., USB or Serial) or wireless (e.g., BlueTooth, RFID, Infrared) connection.

As seen in FIG. 2, peripheral toy 20 may include a housing 24 with an integral card reader 26 and a surface 28 adapted to receive one or more portable playing cards 30 (see FIGS. 1, 3 and 5-6). FIG. 3 depicts an example logic circuit that may be implemented in peripheral toys 20 such as those shown in FIGS. 1 and 2. Integral card reader 26 is shown here as a series of optical pickups. Peripheral toy 20 may also include a CPU 29, also referred to as a controller, which may be configured to control the interaction of various components of peripheral toy 20. Additional components will be described further below.

Figure 6:
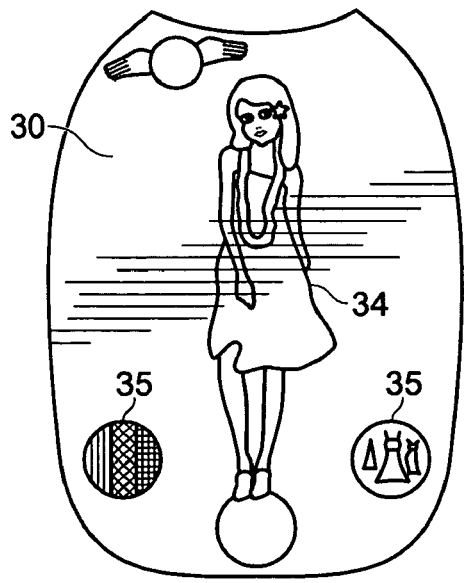
FIGS. 6 and 7 are front and rear views, respectively, of an example playing card usable with devices such as those shown in FIGS. 1-5, according to one embodiment of the disclosure.

As shown in FIG. 4, a user may install one or more portable playing cards 30 onto surface 28 of peripheral toy 20. Integral card reader 26 may read indicia 32 on a surface of playing card 30 (e.g., on the back of playing card 30, as seen in FIG. 6) to obtain identification information about playing card 30. CPU 29 may be configured to receive from integral card reader 26 the playing card identification information and to communicate instructions through interface 22 to computing device 10 to provide an output related to the received identification information.

In some embodiments, identification information about playing card 30 may include information relating to a character 34 depicted on card 30. Placing playing card 30 on surface 28 may cause CPU 29 to instruct computing device 10 to output image 16 (see FIG. 1) appearing similar or being related to the character 34 on computer monitor 14. A user may control image 16 on monitor 14 with peripheral toy 20 by manipulating controls on peripheral toy 20 to cause CPU 29 to send control signals to computing device 10 via interface 22.

While many methods of reading data from playing card 30 may be implemented (e.g., USB, serial, memory card, barcode, RFID), in an exemplary embodiment, each sensor of integral card reader 26 is configured to optically read a single portion of indicia 32 on card 30 to ascertain information about card 30. For example, the example integral card reader 26 shown in FIGS. 2 and 3 includes five sensors representing five binary digits, allowing for 31 permutations or discrete card identities. While the least significant bit in FIG. 2 is shown on the right, this is not intended to be limiting, and it should be understood that the sensors in integral card reader 26 may be in any order.

Figure 7:
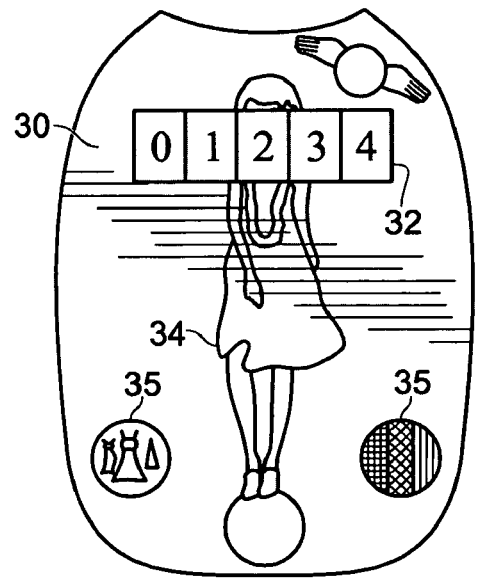

FIGS. 6 and 7 depict the front and back, respectively, of an example playing card 30 compatible with the toy 20 shown in FIGS. 1-5. Indicia 32 are seen in FIG. 7 on the back of card 30 comprising five individual value indicators. Each value indicator may be adapted to be read by a single sensor of integral card reader 26. Each value indicator may be capable of communicating one or more pieces of information. In this example, the most significant bit of indicia 32 is arranged oppositely relative to the most significant bit of the integral card reader 26 so that the most significant bits will line up when the back of card 30 is faced towards integral card reader 26.

As seen in FIGS. 2 and 3, peripheral toy 20 may include additional features, such as a camera 36, camera control buttons 37, other input controls 38, and a four-way directional pad 39. In some embodiments, camera 36 includes an image sensor and lens, allowing photographs to be taken. Alternatively, camera 36 may be a simulation only, but camera control buttons 37 may be used to trigger the display of simulated photographs on computing device 10. Four-way directional pad 39 may be similar to that described in U.S. Pat. No. 4,687,200, the disclosure of which is incorporated herein by reference for all purposes.

Referring back to FIG. 2, peripheral toy 20 may include controls such as a capacitive touchpad assembly 40 comprising one or more capacitive touchpads/touch surfaces 42 disposed on housing 24 of peripheral toy 20, often on surface 28. In some embodiments, each capacitive touch surface 42 is covered by a decorative dielectric material. Contacting a capacitive touch surface 42 with an object such as a human finger modifies the effective capacitance of the capacitive touch surface 42. This modification of capacitance, and hence whether a capacitive touch surface 42 is being touched, may be detected by altering a voltage of the capacitive touch surface 42 and measuring the amount of time required for the capacitive touch surface 42 to reach a threshold voltage.

Playing card 30 may be constructed of materials chosen so that placement of card 30 on surface 28 will not interfere with the operation of capacitive touchpad assembly 40. For example, capacitive touch surface 42 may be configured to detect touching through playing card 30.

Card 30 also may be usable to improve the usability of capacitive touchpad assembly 40. For example, card 30 may include one or more control area indicators 35 that indicate a particular portion of card 30 that will overlay a particular capacitive touch surface 42. The underlying capacitive touch surface 42 may cause computing device 10 to alter output image 16 in a manner that is related to what is depicted in the particular control area indicator 35. For example, in FIG. 6, card 30 includes control area indicator 35 depicting clothing. When card 30 is installed on toy 20, CPU 29 may be configured to alter the clothing of character output 16 when the capacitive touch surface 42 underlying this control area indicator 35 is touched.

Figure 8:
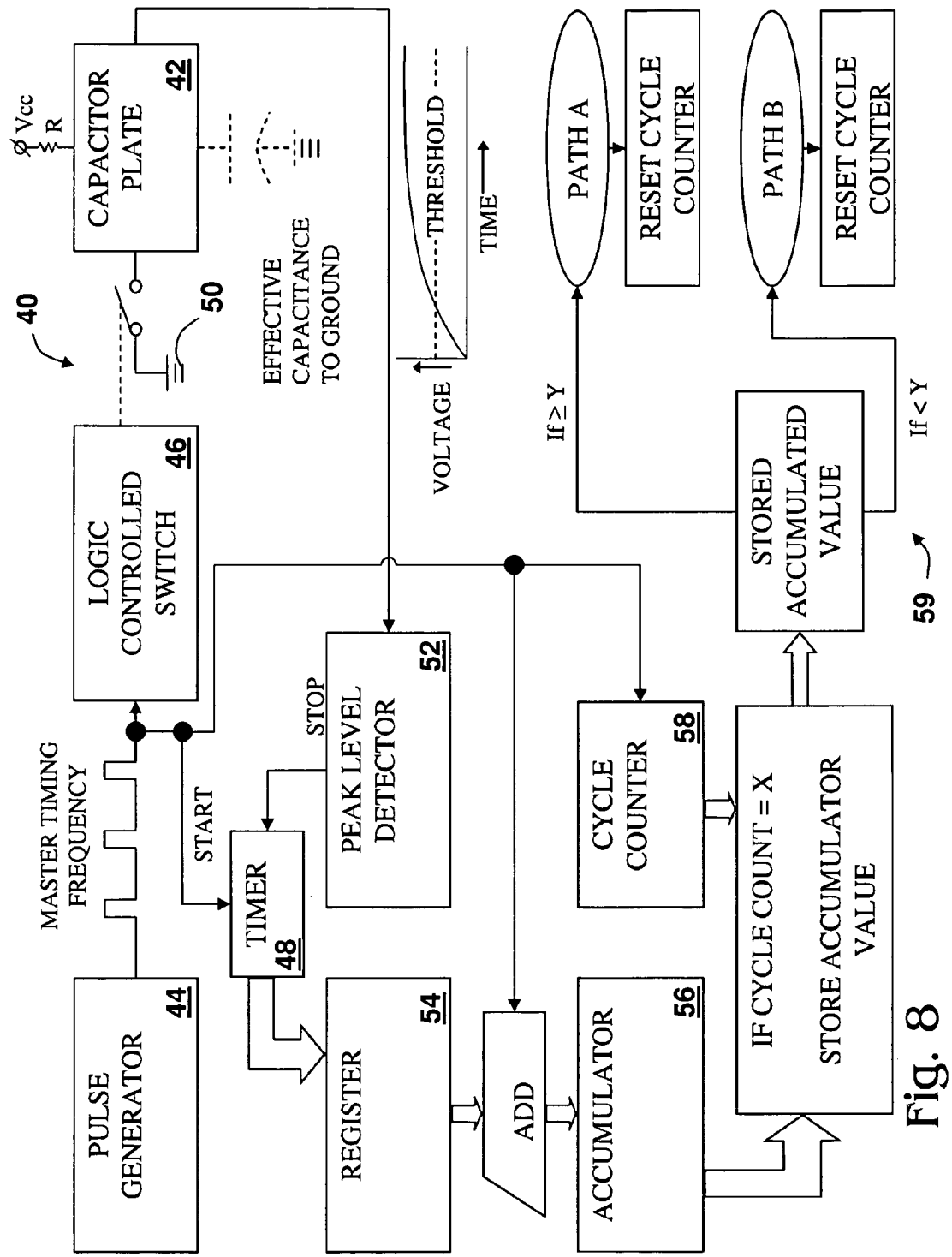
FIG. 8 depicts example circuit logic for detecting whether a capacitive touch surface is being touched, according to one embodiment of the disclosure.

FIG. 8 illustrates example circuit logic for monitoring the capacitance of capacitive touch surface 42, and hence whether capacitive touch surface 42 is being touched Repeatedly, capacitive touch surface 42 is charged at least until its voltage reaches a predetermined threshold value, and the time required to reach the predetermined charge threshold in each instance is measured. Capacitive touch surface 42 is connected to a power source Vcc. A pulse generator or clock 44 generates pulses, and in many cases timing pulses, to a logic-controlled switch 46 to define recurring intervals. The pulses are also provided to a timer 48. Logic-controlled switch 46 may be a microchip, an ASIC or other similar circuitry, and may be configured to open and close a connection between capacitive touch surface 42 and ground 50 to alter a voltage of capacitive touch surface 42.

Connection to ground 50 discharges capacitive touch surface 42 quickly, particularly where little to no resistance exists between capacitive touch surface 42 and ground 50. However, as will be seen in other embodiments described below, a resistor may be included between capacitive touch surface 42 and ground 50 to cause the discharge of capacitive touch surface 42 to be more gradual.

Figure 9:
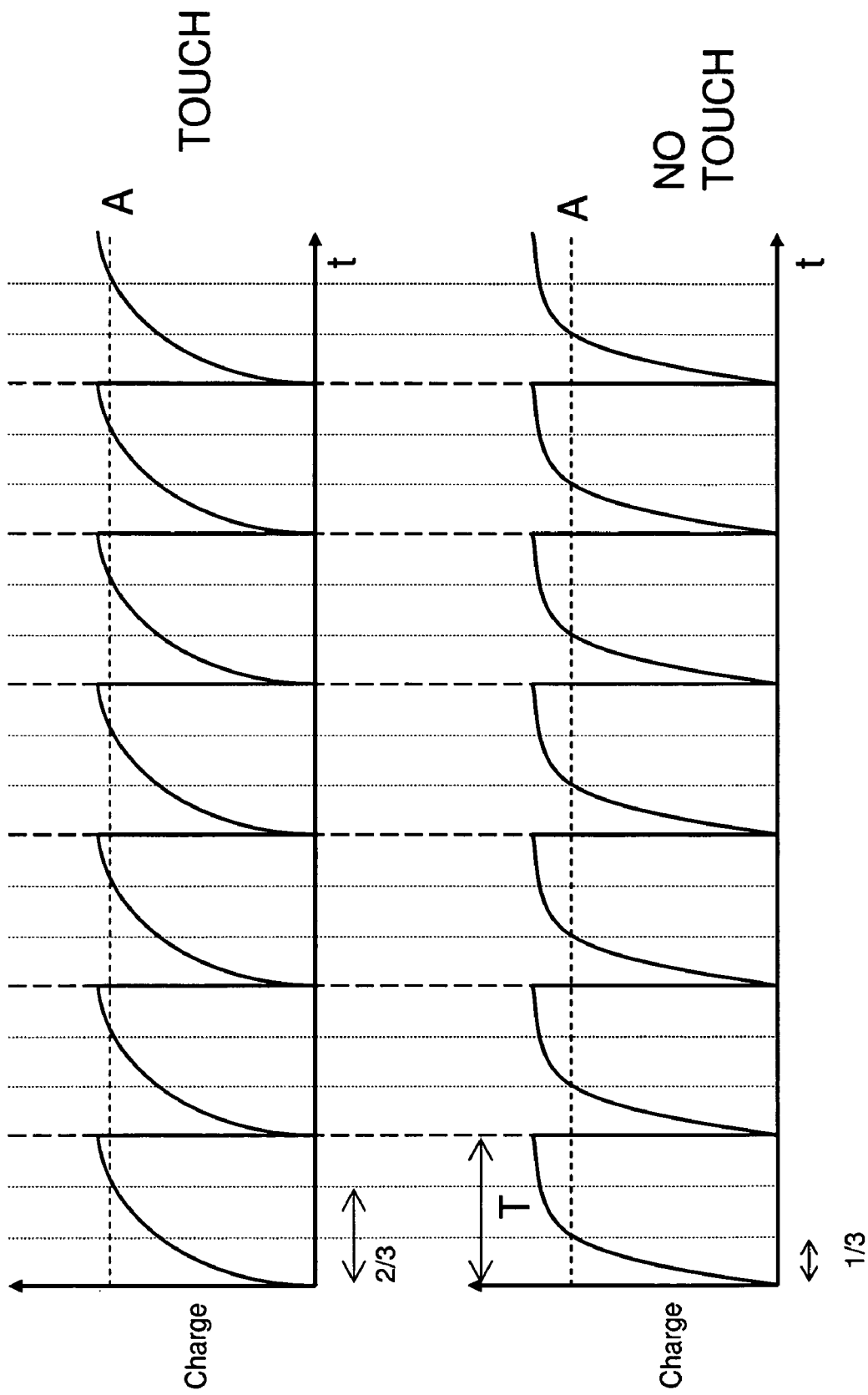
FIG. 9 depicts two charts showing the differences in capacitance as a function of time between a capacitive touch surface being touched and not being touched, in a capacitive touchpad assembly incorporating the circuit logic of FIG. 8.

A peak level detector 52 is coupled to capacitive touch surface 42 and is configured to detect, and indicate to timer 48, when the voltage of capacitive touch surface 42 reaches the threshold voltage (indicated by dotted line A in FIG. 9). Accordingly, timer 48 may be configured to capture or measure the time required to charge capacitive touch surface 42 to the threshold voltage. Timer 48 may be started based on output from pulse generator 44 (e.g., at the beginning of each interval T, which typically would be a time interval) and stopped at the instruction of peak level detector 52 (i.e., when the threshold voltage is reached). When timer 48 stops, it may store the measured time in a register 54, and the measured time may be added to a sum of captured times contained in an accumulator 56.

Timer 48 may measure times during a predetermined number of intervals, or in other words, during a sample. A cycle counter 58 may track intervals in order to control sample size. For example, if a sample size is to be X intervals T, cycle counter 58 increments X times, during which time accumulator 56 accumulates X measured charge times from timer 48. Once X cycles pass, the sample is complete.

Once a sample is complete, the sum value in accumulator 56 may be stored and accumulator 56 may be reset to zero. Using control circuitry implementing logic indicated generally at 59, the sum value from accumulator 56 then may be compared to a predetermined value or threshold Y. If it is above (or in some cases, greater than or equal to) the threshold Y, then it may be determined in Path A that capacitive touch surface 42 was being touched during the sample. If the stored accumulator value is below the threshold Y, then it may be determined in Path B that capacitive touch surface 42 was not being touched during the sample.

Example results of the circuit logic shown in FIG. 8 are depicted graphically in FIG. 9. A sample where capacitive touch surface 42 is being touched is shown in the top graph labeled "TOUCH." Because capacitive touch surface 42 is being touched, its capacitance is higher. Accordingly, more of an interval, e.g., ⅔ of an interval T, may be required to charge capacitive touch surface 42 to the threshold voltage indicated by dotted line A.

An example where capacitive touch surface 42 is not being touched is shown in the bottom graph of FIG. 9 labeled "NO TOUCH." Because the capacitance of capacitive touch surface 42 is lower when it is not being touched, less of an interval, e.g., only ⅓ of an interval T, may be required to charge capacitive touch surface 42 to the threshold voltage indicated by dotted line A.

Continuing with the logic of FIG. 8 and referring also to FIG. 9, for each interval T, ⅔ is added to accumulator 56 when the capacitive touch surface 42 is being touched and ⅓ is added to accumulator 56 when the capacitive touch surface 42 is not being touched. Assuming a sample size of 9 intervals T (only 7 intervals are shown in FIG. 9), if the total sum in accumulator 56 is greater than or equal a predetermined value (e.g., 6), then capacitive touch surface 42 may be considered to be touched for that sample. In such a case, control circuitry implementing the logic indicated generally at 59, which may include one or more of the components described herein, may produce a signal indicative of the capacitive touch surface 42 being touched. Likewise, if the total sum in accumulator 56 is less than a predetermined value (e.g., less than 6), then capacitive touch surface 42 may be considered untouched for that sample, and the control circuitry may produce a signal indicative of such.

At the end of each interval T and/or the beginning of the next interval T+1, the charging of capacitive touch surface 42 may cease and capacitive touch surface 42 may be connected to ground 50 to discharge its voltage, immediately prior to its being charged again. This creates a break in time between the charges of capacitive touch surface 42 that makes a sample readily observable using an oscilloscope. This also makes the determination of whether capacitive touch surface 42 is being touched entirely independent of any frequency of a signal, as the recurring intervals from clock 44 assure a constant frequency.

Figure 10:
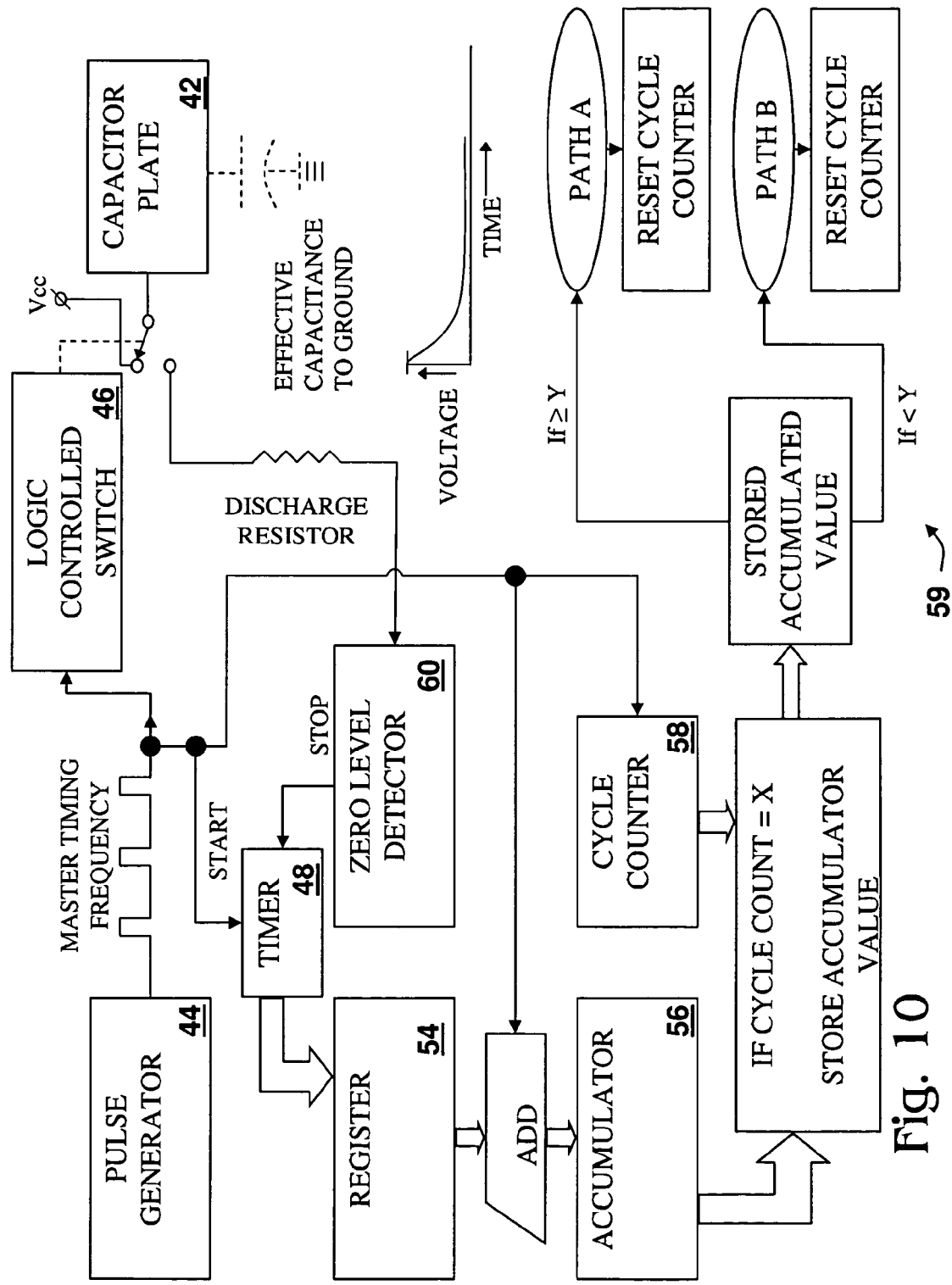
FIG. 10 depicts alternative circuit logic for detecting whether a capacitive touch surface is being touched, according to one embodiment of the disclosure.

Alternative circuit logic is depicted in FIG. 10. This embodiment is similar to the one shown in FIG. 8 except that instead of measuring the time required to charge capacitive touch surface 42 to a threshold voltage, this embodiment measures the time required to discharge capacitive touch surface 42 to a threshold voltage.

At the beginning of each interval T and immediately prior to capacitive touch surface 42 being discharged, timer 48 is set to zero and logic-controlled switch 46 connects capacitive touch surface 42 to a power supply Vcc for either a predetermined amount of time or until a predetermined charge (labeled B in FIG. 11) is reached. Once capacitive touch surface 42 is charged, logic-controlled switch 46 disconnects capacitive touch surface 42 from the power supply Vcc so that the voltage of capacitive touch plate 42 is gradually discharged through a discharge resistor.

In FIG. 10, a zero level detector 60 is connected to capacitive touch surface 42 to detect when the voltage of the capacitive touch surface 42 drops to zero. Once this happens, zero level detector 60 instructs timer 48 to stop. Accordingly, the time measured by timer 48 is the time required to charge capacitive touch surface 42, plus the time required to discharge the voltage of capacitive touch surface 42 to zero. As was the case above, the sum of the measured times for a sample are accumulated in accumulator 56. The remaining logic may be identical to that shown in FIG. 8. Although a zero level detector 60 is shown in FIG. 10, indicating a predetermined threshold value of zero, it should be understood that other non-zero predetermined threshold values may also be selected.

Figure 11:
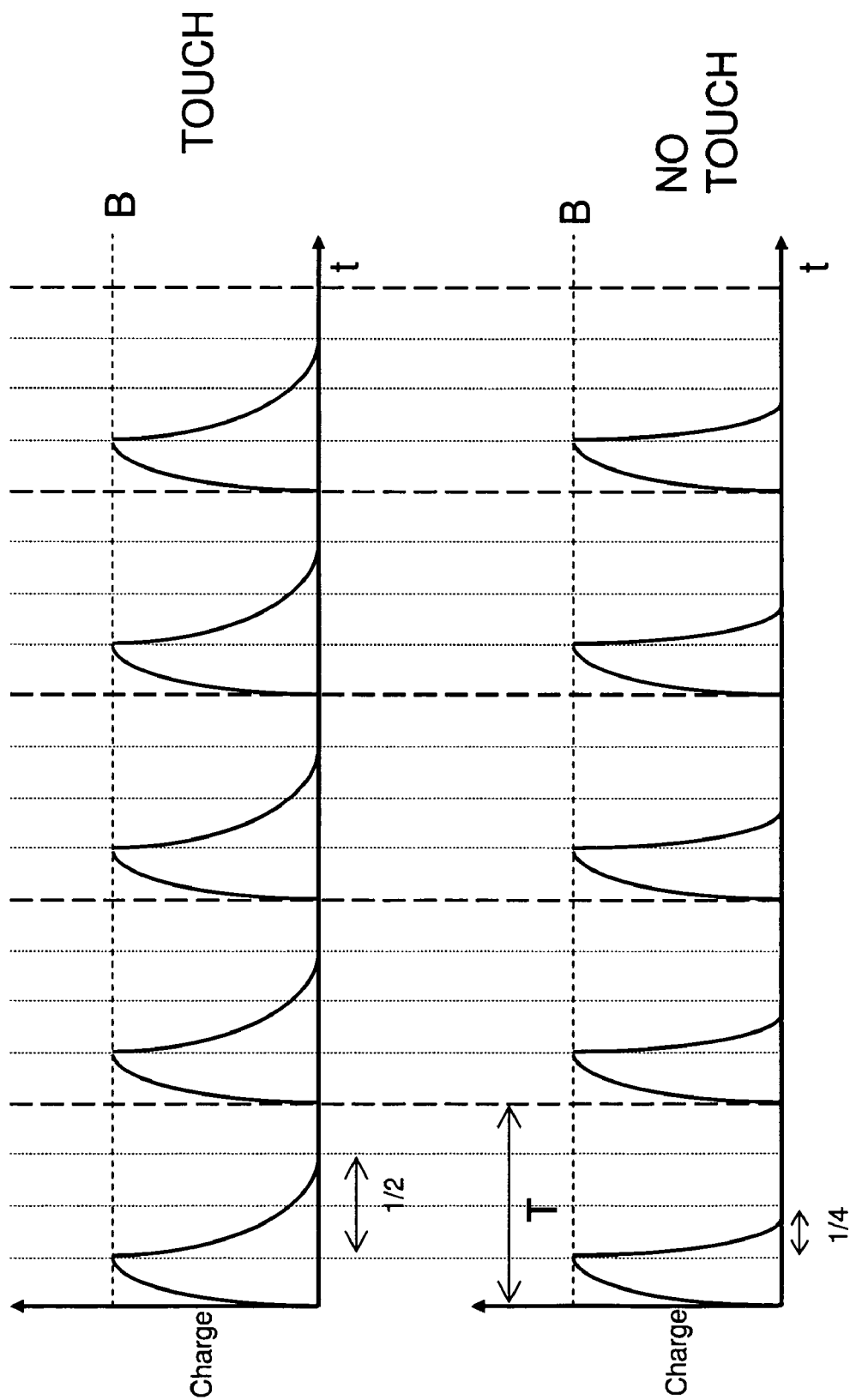
FIG. 11 depicts two charts showing the differences in capacitance as a function of time between a capacitive touch surface being touched and not being touched, in a capacitive touchpad assembly incorporating the circuit logic of FIG. 10.

Example results of the logic circuit shown in FIG. 10 are depicted graphically in FIG. 11. A sample where a capacitive touch surface 42 is being touched is shown in the top graph of FIG. 11 labeled "TOUCH." Because capacitive touch surface 42 is being touched, its capacitance is higher, which means more time is required for it to discharge. In this case, ½ of an interval T is required to discharge capacitive touch surface 42 to zero. In the bottom graph of FIG. 11 labeled "NO TOUCH", capacitive touch surface 42 is not being touched, making its capacitance lower and decreasing the time required for it to discharge. In this case, ¼ of an interval T is required to discharge capacitive touch surface 42 to zero.

Assuming a sample size of 5 intervals T, the amount of time accumulated in accumulator 56 may be compared to a threshold of Y=2.5. If the accumulated time is greater than or equal to 2.5 (½×5=2.5), then it may be determined that capacitive touch surface 42 is being touched. In such a case, the control circuitry implementing the logic indicated at 59 may produce a signal indicative of the capacitive touch surface 42 being touched. If the accumulated time is less than 2.5 (¼×5=1.25), then it may be determined that the capacitive touch surface 42 is not being touched, and the control circuitry may produce a signal indicating as much. It should be understood that the threshold to which the accumulated time is compared may be adjusted upwards or downwards, decreasing or increasing, respectively, the sensitivity of capacitive touch surface 42.

In some embodiments, a signal communicated from peripheral toy 20 to computing device 10 via interface 22 may utilize one or more communication or electronic protocols. For example, actions taken using capacitive touchpad assembly 40 or other controls on peripheral toy 20 may be transmitted to computing device 10 in a format such as USB. In some embodiments, software executing on computing device 10 may be operated even without toy 20 (where toy 20 is lost or damaged) using another USB input device. The following list contains an example set of USB keystrokes that may be mapped to various capacitive touchpads on toy 20.

| | |
|---|---|
| Up = | Alt_Up Arrow = E2h OR E6h AND 52h Usage ID |
| Dn = | Alt_Down Arrow = E2h OR E6h AND 51h Usage ID |
| Rt = | Alt_Right Arrow = E2h OR E6h AND 4Fh Usage ID |
| Lt = | Alt_Left Arrow = E2h OR E6h AND 50h Usage ID |
| Camera = | Alt_Spacebar = E2h OR E6h AND 2Ch Usage ID |
| Yes = | Alt_Enter = E2h OR E6h AND 28h Usage ID |
| No = | Alt_Backspace = E2h OR E6h AND 2Ah Usage ID |
| Sw01 = | Alt_Q = E2h OR E6h AND 14h Usage ID |
| Sw02 = | Alt_W = E2h OR E6h AND 1Ah Usage ID |
| Sw03 = | Alt_E = E2h OR E6h AND 08h Usage ID |
| Sw04 = | Alt_R = E2h OR E6h AND 15h Usage ID |
| Sw05 = | Alt_T = E2h OR E6h AND 17h Usage ID |
| Sw06 = | Alt_Y = E2h OR E6h AND 1Ch Usage ID |
| Sw07 = | Alt_A = E2h OR E6h AND 04h Usage ID |
| Sw08 = | Alt_S = E2h OR E6h AND 16h Usage ID |
| Sw09 = | Alt_D = E2h OR E6h AND 07h Usage ID |
| Sw10 = | Alt_F = E2h OR E6h AND 09h Usage ID |
| Sw11 = | Alt_G = E2h OR E6h AND 0Ah Usage ID |
| Sw12 = | Alt_Z = E2h OR E6h AND 1Dh Usage ID |
| Card01 = | Alt_1 = E2h OR E6h AND 1Eh Usage ID |
| Card02 = | Alt_2 = E2h OR E6h AND 1Fh Usage ID |
| Card03 = | Alt_3 = E2h OR E6h AND 20h Usage ID |
| Card04 = | Alt_4 = E2h OR E6h AND 21h Usage ID |
| Card05 = | Alt_5 = E2h OR E6h AND 22h Usage ID |
| Card06 = | Alt_6 = E2h OR E6h AND 23h Usage ID |
| Card07 = | Alt_7 = E2h OR E6h AND 24h Usage ID |
| Card08 = | Alt_8 = E2h OR E6h AND 25h Usage ID |
| Card09 = | Alt_9 = E2h OR E6h AND 26h Usage ID |
| Card10 = | Alt_0 = E2h OR E6h AND 27h Usage ID |
| Card11 = | Alt_U = E2h OR E6h AND 18h Usage ID |
| Card12 = | Alt_P = E2h OR E6h AND 13h Usage ID |
| Card13 = | Alt_H = E2h OR E6h AND 0Bh Usage ID |
| Card14 = | Alt_J = E2h OR E6h AND 0Dh Usage ID |
| Card15 = | Alt_K = E2h OR E6h AND 0Eh Usage ID |
| Card16 = | Alt_L = E2h OR E6h AND 0Fh Usage ID |
| Card17 = | Alt_N = E2h OR E6h AND 11h Usage ID |
| Card18 = | Alt_M = E2h OR E6h AND 10h Usage ID |
| Card19 = | Alt_< = E2h OR E6h AND 36h Usage ID |
| Card20 = | Alt_> = E2h OR E6h AND 37h Usage ID |

While embodiments of a toy and associated computer systems and methods of use have been particularly shown and described, many variations may be made therein. This disclosure may include one or more independent or interdependent embodiments directed to various combinations of features, functions, elements and/or properties. Other combinations and sub-combinations of features, functions, elements and/or properties may be claimed later in this or a related application. Such variations, whether they are directed to different combinations or directed to the same combinations, whether different, broader, narrower or equal in scope, are also regarded as included within the subject matter of the present disclosure. Accordingly, the foregoing embodiments are illustrative, and no single feature or element, or combination thereof, is essential to all possible combinations that may be claimed in this or a later application. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

What is claimed is:

1. A computer peripheral toy comprising:
a capacitive touchpad assembly comprising:
a capacitive touch surface;
a pulse generator configured to provide pulses defining recurring intervals;
a logic-controlled switch for altering a voltage of the capacitive touch surface during each interval until the voltage of the capacitive touch surface reaches a threshold voltage;
a timer configured to measure the time required for the voltage of the capacitive touch surface to reach the threshold voltage in each interval;
an accumulator configured to accumulate the times measured by the timer during a predetermined number of intervals; and
control circuitry configured to produce a signal indicative of the capacitive touch surface being touched where the accumulated time is greater than a predetermined value;
a housing having a surface adapted to receive a playing card;
a reader configured to read from a playing card placed on the surface identification information about the playing card;
an interface between the toy and a computing device; and
a controller configured to:
receive from the reader the identification information about the playing card placed on the surface; and
communicate instructions through the interface to the computing device to cause the computing device to provide an output related to the received identification information;
wherein the capacitive touch surface is formed on the surface adapted to receive a playing card, and the capacitive touch surface is configured to detect touching through the playing card.

2. The capacitive touchpad assembly of claim 1, wherein altering the voltage of the capacitive touch surface includes charging the capacitive touch surface at least until the voltage of the capacitive touch surface rises to the threshold voltage.

3. The capacitive touchpad assembly of claim 2, wherein altering the voltage of the capacitive touch surface further includes discharging the capacitive touch surface at the beginning of each interval immediately prior to charging the capacitive touch surface.

4. The capacitive touchpad assembly of claim 1, wherein altering the voltage of the capacitive touch surface includes discharging the capacitive touch surface at least until the voltage of the capacitive touch surface drops to the threshold voltage.

5. The capacitive touchpad assembly of claim 4, wherein the threshold voltage is zero.

6. The capacitive touchpad assembly of claim 4, further comprising a resistor through which the voltage of the capacitive touch surface is gradually discharged.

7. The capacitive touchpad assembly of claim 4, wherein altering the voltage of the capacitive touch surface further includes charging the capacitive touch surface at the beginning of each interval immediately prior to discharging the capacitive touch surface.

8. A method of detecting contact with a capacitive touch surface comprising:
providing a computer peripheral toy, including a housing with having a surface adapted to receive a playing card, a reader configured to read from a playing card placed on the surface identification information about the playing card, an interface between the toy and a computing device, and a controller configured to receive from the reader the identification information about the playing card placed on the surface and communicate instructions through the interface to the computing device to cause the computing device to provide an output related to the received identification information, wherein the capacitive touch surface is formed on the surface adapted to receive a playing card, and the capacitive touch surface is configured to detect touching through the playing card;
providing pulses to define recurring intervals;
altering a voltage of the capacitive touch surface during each interval until the voltage of the capacitive touch surface reaches a threshold voltage;
measuring the time required for the voltage of the capacitive touch surface to reach the threshold voltage in each interval;
accumulating the times measured during a predetermined number of intervals; and
indicating that the capacitive touch surface is being touched where the accumulated time is greater than a predetermined value.

9. The method claim 8, wherein altering the voltage of the capacitive touch surface includes charging the capacitive touch surface at least until the voltage of the capacitive touch surface rises to the threshold voltage.

10. The method of claim 9, wherein altering the voltage of the capacitive touch surface further includes discharging the capacitive touch surface at the beginning of each interval immediately prior to charging the capacitive touch surface.

11. The method of claim 8, wherein altering the voltage of the capacitive touch surface includes discharging the capacitive touch surface at least until the voltage of the capacitive touch surface drops to the threshold voltage.

12. The method of claim 11, wherein the threshold voltage is zero.

13. The method of claim 11, wherein discharging the capacitive touch surface includes discharging the capacitive touch surface gradually through a resistor.

14. The method of claim 11, wherein altering the voltage of the capacitive touch surface further includes charging the capacitive touch surface at the beginning of each interval immediately prior to discharging the capacitive touch surface.

15. A capacitive touchpad assembly comprising:
a capacitive touchpad;
a housing having a surface adapted to receive a playing card;
a reader configured to read from a playing card placed on the surface identification information about the playing card;
an interface between the toy and a computing device;
a controller configured to:
receive from the reader the identification information about the playing card placed on the surface; and
communicate instructions through the interface to the computing device to cause the computing device to provide an output related to the received identification information;
wherein the capacitive touch surface is formed on the surface adapted to receive a playing card, and the capacitive touch surface is configured to detect touching through the playing card;
a clock configured to provide recurring time intervals;
control circuitry configured to perform the following steps for a predetermined number of time intervals:
alter a voltage of the capacitive touchpad until the voltage of the capacitive touchpad reaches a threshold voltage;
measure the time required for the voltage of the capacitive touchpad to reach the threshold voltage;
accumulate the measured time;
wherein upon completion of the predetermined number of time intervals, the control circuitry is further configured to indicate contact with the capacitive touchpad where the accumulated time is greater than a threshold value.

16. The capacitive touchpad assembly of claim 15, wherein altering the voltage of the capacitive touchpad includes charging the capacitive touchpad until the voltage of the capacitive touchpad rises to the threshold voltage.

17. The capacitive touchpad assembly of claim 16, wherein altering the voltage of the capacitive touchpad further includes discharging the capacitive touchpad at the beginning of each time interval immediately prior to charging the capacitive touchpad.

18. The capacitive touchpad assembly of claim 15, wherein altering the voltage of the capacitive touchpad includes discharging the capacitive touchpad until the voltage of the capacitive touchpad drops to the threshold voltage.

19. The capacitive touchpad assembly of claim 18, wherein altering the voltage of the capacitive touchpad further includes charging the capacitive touchpad at the beginning of each time interval immediately prior to discharging the capacitive touchpad.

* * * * *